Aug. 10, 1965   R. D. CHAPIN   3,199,784
PLANT WATERING DEVICE
Filed Oct. 12, 1962   4 Sheets-Sheet 3

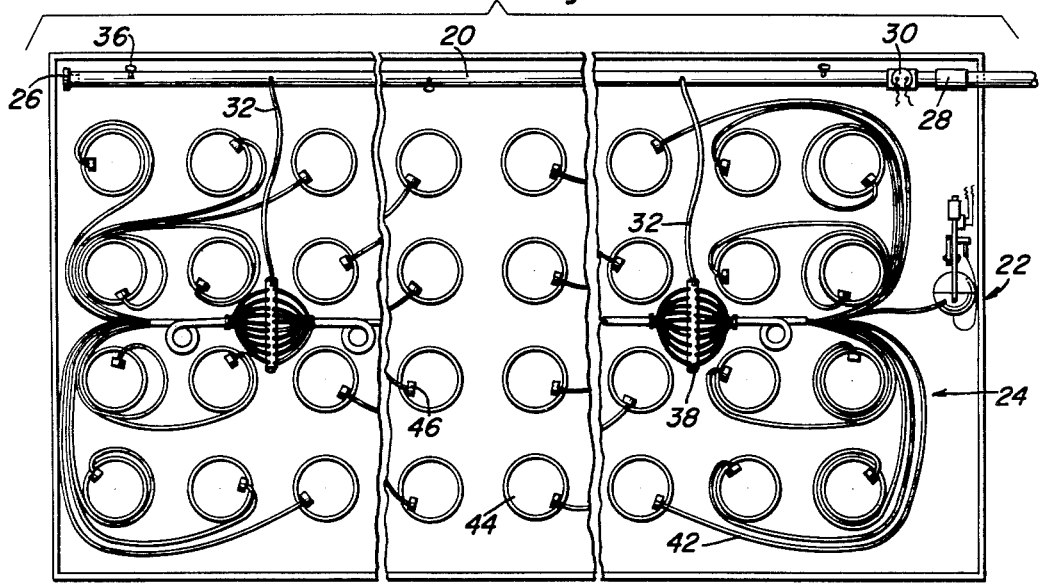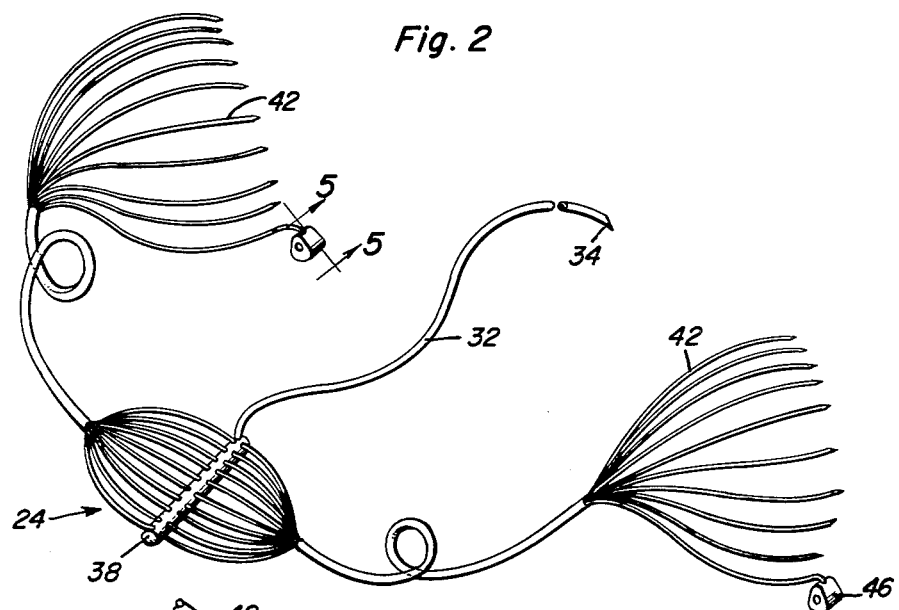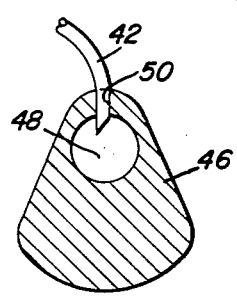

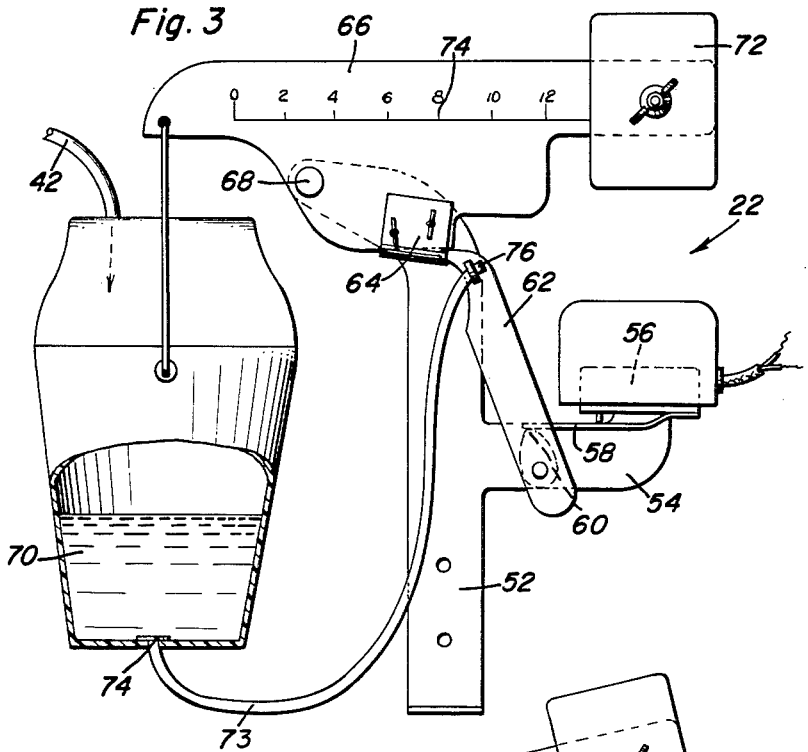
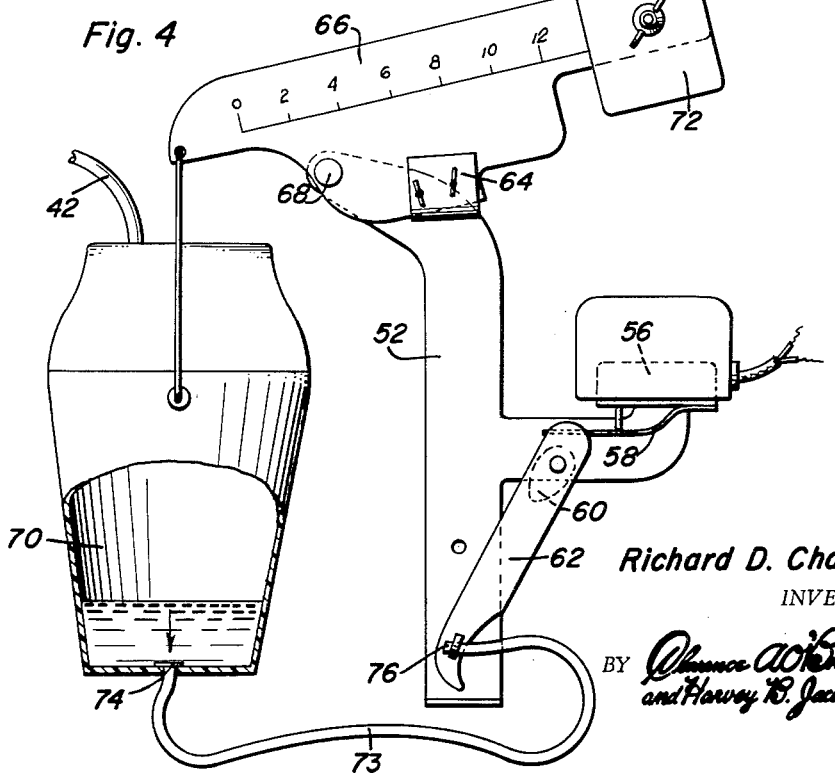

Richard D. Chapin
INVENTOR.

BY *Clarence A. O'Brien*
*and Harvey B. Jackson*
Attorneys

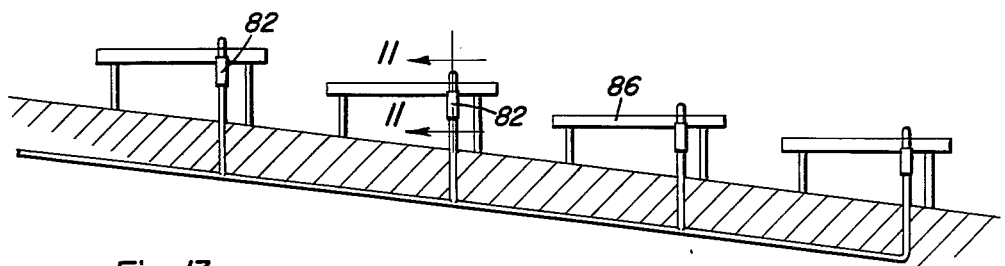
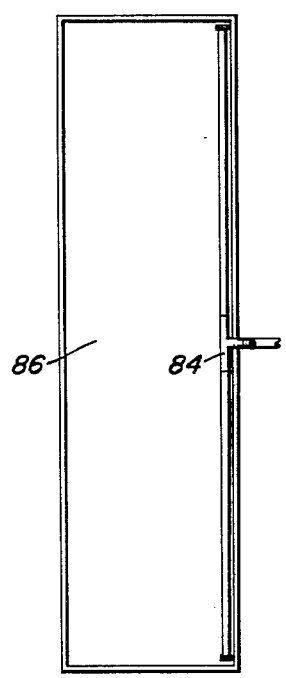
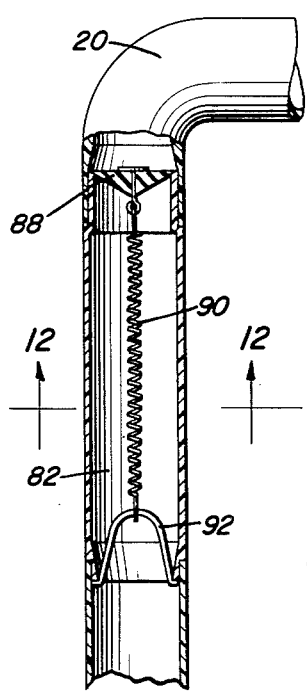
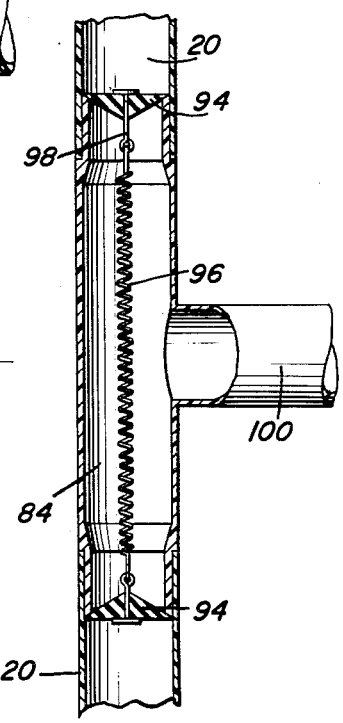
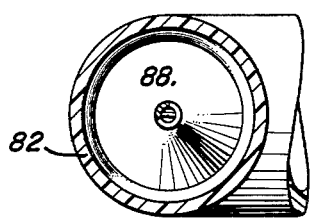
Richard D. Chapin
INVENTOR.

United States Patent Office 3,199,784
Patented Aug. 10, 1965

3,199,784
PLANT WATERING DEVICE
Richard D. Chapin, 368 N. Colorado Ave.,
Watertown, N.Y.
Filed Oct. 12, 1962, Ser. No. 230,114
11 Claims. (Cl. 239—65)

The present invention generally relates to a device for automatically watering a large number of plants, and is more particularly concerned with a device constituting an improvement over that shown in applicant's co-pending application Serial No. 111,363, filed May 19, 1961, now Patent No. 3,085,364.

As will be appreciated by those familiar with the raising of plants, particularly in commercial establishments, the effective watering of the plants, sometimes numbering in the tens of thousands, is an extremely tedious and time consuming operation which is made even more difficult by the frequent necessity of positioning many plants at places not easily accessible such as on high shelves or at the center of extremely wide benches.

Accordingly, it is one of the primary intentions of the present invention to provide a device for efficiently and properly watering any number of plants automatically regardless of their location or normal accessibility.

Also, a significant object of the present invention is to provide an automatic watering device wherein the controls therefor can be located remote from the plants to be watered.

Another object of the present invention is to provide a watering system wherein different groups of plants can be supplied with different amounts of water.

Furthermore, it is considered significant that the present invention enables the watering of a large number of potted plants with a relatively small water supply, various groups of these plants being automatically watered consecutively.

Similarly, it is an object of the present invention to provide for the watering of a large number of plants with the amount of water supplied to each plant being equal and with the water pressure maintained substantially uniform throughout the system.

Likewise, an object of the present invention resides in the provision of a watering system which can be incorporated into the conventionally used misting systems.

In fulfilling the above objects, the device of the present invention utilizes a novel distributing manifold unit connected to an elongated water main without the use of any fittings whatsoever, but rather, relying on a novel frictional engagement. This novel distributing manifold unit is capable of prefabrication thus facilitating the installation of the entire unit of the present invention and at the same time readily allowing the user to vary his plant arrangements and still maintain the proper water supply.

Also, the present invention contemplates the incorporation of novel check valves therein so as to prevent any undesirable backflow such as might occur during the provision of water to potted plants located on sloping benches.

Furthermore, an object of the present invention is to provide a novel means for releasably retaining a separate leader tube in each plant pot, this means additionally functioning so as to gently distribute the water thus preventing any washing away of the soil.

Furthermore, while the invention is primarily intended for commercial greenhouse use, it can be equally effective for plants in home gardens, patios, window boxes, pots, tubs and any place where plants are located. Also, it will be recognized that the present invention contemplates the watering of any combination of the above mentioned plants along with plants directly in the ground.

An additional object of the invention is to provide a flexible system of watering plants whereby any desired amount of water can be put on different plants in any number of combinations of locations at the same time by varying the number, length and diameter of the leader tubes, and, by varying the length and diameter of the supply tubes.

The final object to be specifically enumerated resides in the provision of a device which, though simple in construction, is extremely effective for its intended purpose and is additionally of extremely durable construction requiring little or no maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 illustrates a top plan view of a plurality of potted plants arranged on a greenhouse bench and the watering device of the present invention being operatively associated therewith;

FIGURE 2 is a perspective view of one of the distributing units used in FIGURE 1;

FIGURE 3 is an elevational view of the control mechanism of the present invention with the control lever being orientated so as to maintain the micro-switch in an on position;

FIGURE 4 is a view similar to that of FIGURE 3 however illustrating the control valve in a released position allowing a deenergization of the micro-switch and emptying of the control container;

FIGURE 5 is an enlarged cross-sectional view taken substantially on a plane passing along line 5—5 in FIG-2 and illustrating the novel leader tube holder forming a part of the present invention;

FIGURE 10 is a schematic end view of a plurality of greenhouse benches arranged at different heights showing one manner of supplying water thereto;

FIGURE 11 is an enlarged cross-sectional view taken substantially on a plane passing along line 11—11 in FIGURE 10 and illustrating the use of a single check valve as would be required to prevent backflow in the arrangement of FIGURE 10;

FIGURE 12 is an enlarged cross-sectional view taken substantially on a plane passing along line 12—12 in FIGURE 11;

FIGURE 13 is a schematic top plan view illustrating a greenhouse bench and the introduction of the water supply thereto at an intermediate point along the length thereof;

FIGURE 14 is an enlarged cross-sectional view illustrating a double check valve used in conjunction with the introduction of the water supply at a central point as illustrated in FIGURE 13.

Figure 6:
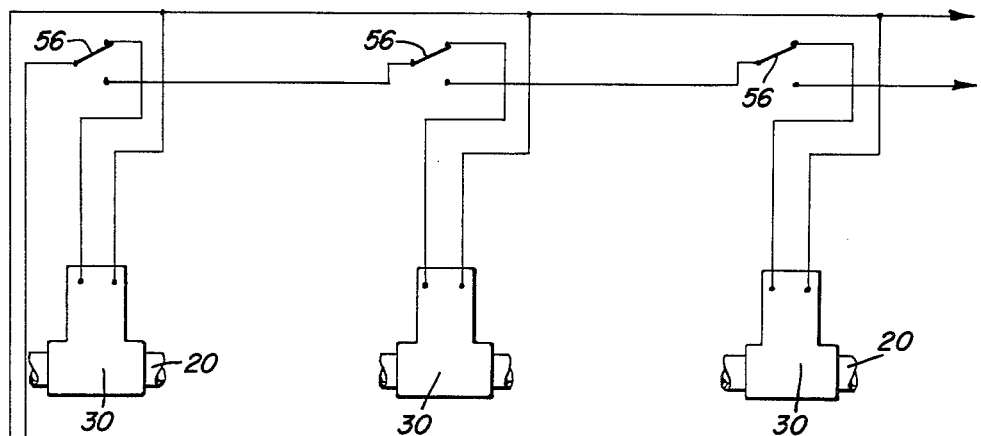
FIGURE 6 is a diagrammatic wiring diagram illustrating the manner in which the present invention contemplates the provision of a plurality of controls for consecutively operating separate solenoid valves so as to consecutively supply water to various different arrangements of the distributing units.
Figure 7:
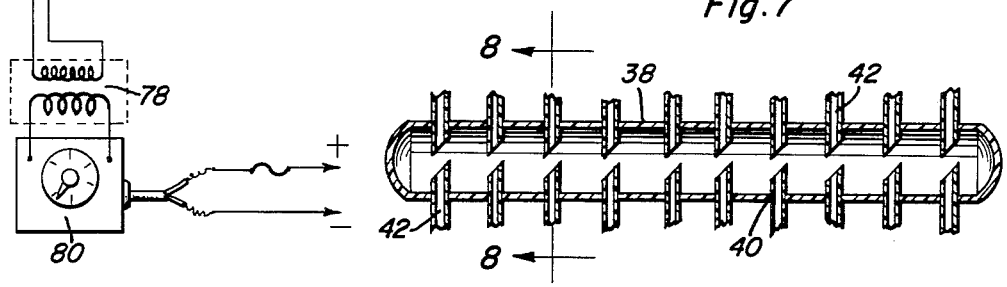
FIGURE 7 is an enlarged cross sectional view through the manifold unit of the distributing units shown in FIGURE 2.
Figure 9:
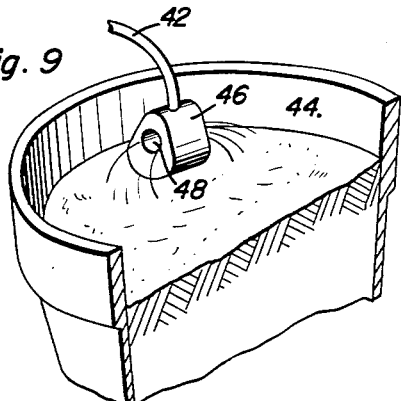
FIGURE 9 is a partial perspective view illustrating the manner in which the leader tube holder is intended to retain the leader tube within a plant pot.
Figure 15:
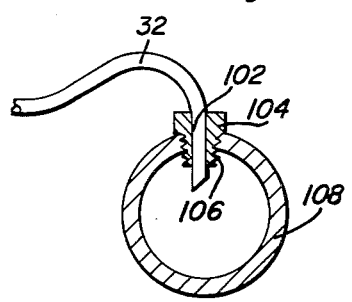
FIGURE 15 is a cross-sectional view illustrating the manner in which the distributing unit of the present invention can be incorporated into a conventional misting system.
Figure 8:
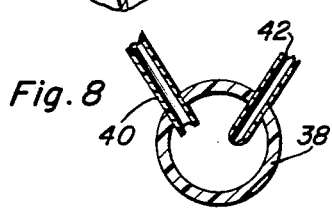
FIGURE 8 is a cross-sectional view taken substantially on a plane passing along line 8—8 in FIGURE 7.

Referring now more particularly to the drawings, it will be appreciated that the plant watering device of the present invention consists basically of an elongated plastic water main 20, control means 22 for regulating the flow of water through the water main 20, and a plurality of distributing units 24 releaseably secured to the main 20 at preselected longitudinally spaced points therealong.

The elongated water main 20 is to be secured at one end thereof to a conventional water supply, the second end of the main 20 being closed by a suitable plug 26. Positioned between the water supply end of the main 20 and the portion thereof to which the distributing units are attached, are both a line strainer 28 and a solenoid valve 30 controlled by the control means 22 in a manner which shall be gone into in detail presently, so as to either allow or prevent the flow of water therethrough. The portion of the main 20 between the solenoid valve 30 and the plug 26 is provided with a plurality of small holes therethrough for the reception and friction retention of the end of the distributing unit supply tube 32. In order to effect this frictional interconnection of the supply tube 32 with the main 20 in a water tight manner, it will be appreciated that the material of either one or both of the members should be slightly resilient with the inserted end of the supply tube 32 being beveled as at 34. Also, inasmuch as it may not in all circumstances be necessary to provide a distributing unit 24 at each of the apertures provided in the main, it is contemplated that the unused apertures be suitably plugged as at 36.

The distributing unit 24, in addition to the supply tube 32, also includes an enlarged manifold 38 having two parallel rows of spaced holes 40 therein frictionally receiving therethrough the inner ends of a plurality of equal length leader tubes 42. The plastic material of either the manifold 38 or the leader tubes 42, or both, is to possess sufficient resiliency so as to enable a tight waterproof frictional fit therebetween as was the case in the connection between the supply tube 32 and the main 20. Such a connection is deemed extremely significant in that a positive water transmitting connection is made both rapidly and without the necessity of providing any complicated or expensive fittings, thus greatly facilitating the manufacture of the units as well as their installation, this resulting in a substantial saving of both time and money wherein large numbers of plants are to be provided for. As noted supra, the leader tubes 42 are all of the same length, this being deemed essential so as to insure the supplying of an equal amount of water to all of the plants fed through a particular manifold 38. Each leader tube 42 has the free end thereof received within a plant pot 44 and held in position by a leader tube holder 46, which in addition to holding the end of the leader tube 42, also functions as a means for dispersing the water flowing therefrom. The tube holder 46 is slightly elongated and provided with an enlarged slightly rounded lower end with sides converging upwardly toward a narrow rounded top, a longitudinally extending enlarged passageway 48 being provided therethrough at a point closer to the reduced upper end than the enlarged base or bottom. The end of the leader tube 42, as best seen in FIGURE 5, communicates with this passage 48 through a transverse hole 50 provided through the rounded upper edge, the leader tube 42 being frictionally engaged therein so as to direct the water flowing therethrough against the wall of the passage 48 diametrically opposed from the aperture 50 so as to break the force of the water and provide for a smooth flow of the water out of each end of the passage 48 thus preventing any washing away of the soil. It will be appreciated that the location of the major weight of the holder 46 at the base thereof provides a stable means for securing the end of the leader tube 42 within the plant pot 44 while at the same time allowing the effortless insertion or removal of both the holder and leader tube without any disturbance of the soil or plant such as would occur if the holder were to be embedded into the soil.

As will be appreciated, in order that a substantial degree of water pressure be maintained throughout the system, the water conduits will progressively decrease in size, the water main 20 being preferably .75 inch, the supply tube 32 being .078 inch and the leader tubes being .035 inch with the manifold having a .625 inside diameter. With these sizes it is contemplated that the main 20 is to supply eighty distributing units 24, each distributing unit 24 having a forty inch supply tube 32 and twenty leader tubes 42 fifty-four inches long.

The control means 22 for opening and closing the solenoid valve 30, as best seen in FIGURES 3 and 4, consists of an upright mounting bracket 52 having a transversely extending support 54 thereon, a micro-switch 56 being mounted on the support member 54. The micro-switch 56 has an arm 58 thereon movable so as to activate or deactivate the switch, this movement being effected by a cam 60 provided on the control lever 62 pivotally mounted on the support member 54 inward of the switch 56 for movement between a first upwardly extending position wherein the switch 56 is activated and a second downwardly extending position, as illustrated in FIGURE 4, wherein the switch 56 is not activated. The lever 62 is maintained in the first upwardly extending position illustrated in FIGURE 3 by engagement of the upper end thereof by a generally U-shaped latch means 64 mounted on the balance arm 66 which is in turn pivotally mounted as at 68 on the upper inwardly extending end of the bracket 52.

This balance arm 66 is provided so as to automatically release the lever 62 and deactivate the switch 56 upon the flowing of a predetermined amount of water. This is accomplished by suspending a water receiving container 70 from the outer end of the balance arm 66 on the opposite side of the pivot point 68 from the latch 64. An adjustable counterweight 72 is mounted on the balance arm 66 which has graduations 74 thereon indicating the particular position to be assumed by the counterweight 72 when a predetermined amount of water is desired on the plants. As will be appreciated from FIGURE 1, one of the leader tubes 42 is extended into communication with the water receiving container 70, the water flowing through this particular leader tube 42 into the container 70 being of the same quantity as that flowing into each of the pots 44. As soon as the predetermined amount of water has simultaneously flowed into the pots 44 and container 70, the balance arm 66 is upended, from a stop limiting its movement in a clockwise direction, by the weight of the container 70 and water therein and the latch 64 is disengaged from the lever 62 thus allowing a downward pivoting of the lever and a deactivation of the micro-switch 56 and a corresponding closing of the solenoid valve and stopping of the flow of water. Further, in order to immediately condition the control means 22 for a manual resetting of the lever 62, it is contemplated that the container 70 be provided with a drainage tube 73 communicating at one end 74 thereof with the bottom of the container 70 and having the second end 76 thereof maintained at the free end of the lever 62, this arrangement preventing the flow of water in the first position illustrated in FIGURE 3 and allowing the draining of the water container 70 in the second position illustrated in FIGURE 4 wherein the free end of the lever 62 is positioned generally in line with the bottom of the container 70.

With particular reference to FIGURE 6, attention is directed to the fact that the present invention contemplates the provision of a series of different setups of the type illustrated in FIGURE 1, each including a control means 22 of the type illustrated in FIGURES 3 and 4, and a solenoid valve associated therewith, wherein these setups can be automatically and sequentially actuated thus enabling the watering of an extremely large number of pots with a relatively small water supply volume. Each of the micro-switches 56 of the control means 22 is to be of the double throw single pole type so that all of the switches 56 can be set to an on position at the same time with the current flowing from the transformer 78 activating only the first switch 56 and solenoid valve 30. Upon the flowing of a predetermined amount of water, the first switch is thrown by the movement of the lever 62 and the current flows through the second control means for energizing the solenoid valve 30 therein. As will be appreciated, such an arrangement enables a varying of the volume of water flow from one setup to another, or in fact, the complete elimination of a setup, this being done by retaining the lever in its second or lower position thus deactivating the mico-switch 56 insofar as the complementary solenoid valve is concerned. Also, if it is desired to automatically activate the entire system at a predetermined time, a time clock 80 can be provided.

The present invention also contemplates the incorporation of either a single check valve 82 or a double check valve 84 within each main 20 depending upon its point of introduction onto a greenhouse bench 86. The single check valve is used when the main 20 is introduced at one end of the bench 86 as illustrated in FIGURE 10, this check valve 82 preventing any undesirable backflow by means of a rubber plug 88 biased into sealing engagement with the forward end of the check valve 82 by a spring means 90, the rear end of which is secured adjacent the rear end of the valve 82 by a wire clip 92. This spring 90 is to be such so as to allow the forward flow of water with a minimum amount of pressure while at the same time being capable of quickly sealing off the flow in case of a occurrence of a backflow. It will be noted that both ends of the cylindrical valve housing are reduced for engagement within the adjacent conduit sections thus additionally functioning as a coupling means. The double check valve 84 is to be used when oppositely extending mains are provided from a central point of introduction on a table 86 as illustrated in FIGURE 13. This double check valve 84 includes two rubber plugs 94, one at each end of the main chamber thereof, these plugs 94 being biased inwardly toward each other against the flow of water by an elongated biasing spring 96 secured to each plug by a pin 98 extending through the plug 94 and engaging the end of the spring 96. This valve 84 is also provided with reduced ends for engagement within the adjoining mains 20, it being readily recognized that the reduced ends in both valves 82 and 84 provide the sealing seat for the plugs. In order that the flow of water be introduced centrally into the double check valve 84, a centrally located laterally extending tubular portion 100 is provided thereon thus providing a T-shaped valve.

In addition to the use of the distributing unit 24 in the manner set forth in detail supra, it is also contemplated that this unit 24 be adaptable for use in conjunction with misting systems by frictionally engaging the supply tube 32 within an aperture 102 provided through a plug 104 threaded within the opening 106 provided in the water pipes 108 of such systems.

From the foregoing, it is considered to be readily apparent that a novel watering device has been defined wherein practically an unlimited number of plants can be watered with each plant or groups of plants receiving a predetermined amount of water. This is accomplished by a hithertofore unknown control system operating solenoid valves for allowing the introduction of water into a plurality of distributing units each consisting of an enlarged manifold and a plurality of equal length leader tubes thus insuring an even distribution of the water. Also, as pointed out in detail supra, the present invention includes a novel leader tube holder for both effectively maintaining the leader tube within a potted plant and simultaneously providing for a smooth dispensing of the water without a washing away of the surrounding soil. Also, as will be appreciated from the specific form of the leader tube holder it enables the removal of the pots from the bench by simply picking up the pot, the holder and attached leader tube falling out of the pot and onto the bench, this being done without any undesirable catching on the plant branches or leaves such as might occur if wire holders were used.

Also deemed of particular significance in regard to the present invention is the fact that the connections both between the supply tube and the main and between the manifold and the leader tubes relies solely on a frictional watertight engagement thus avoiding the necessity of using both expensive and time consuming fittings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in a water distribution system for a plurality of plants, a water supply main, at least one distributing unit, said unit including a supply tube and an enlarged manifold, said supply tube having one end in water receiving communication with said supply main and the second end in communication with the enlarged manifold, a plurality of equal length elongated leader tubes extending outwardly from said manifold toward separate ones of the plurality of plants, and holder means for both retaining each leader tube in the vicinity of the related plant and smoothly dispersing the water flowing from the leader tube so as to prevent a washing away of the plant soil.

2. The structure of claim 1 in combination with a solenoid valve for regulating the flow of water through the supply main, and means for automatically closing the valve upon the flowing of a predetermined amount of water from the leader tubes.

3. The combination of claim 2 wherein said means for automatically closing the valve consists of an upright support bracket, a switch means mounted to one side of said bracket, a balance arm, means pivotally mounting said arm at an intermediate point thereof on the upper end of said bracket, a water receiving container mounted on one end of said arm, one of said leader tubes being in water introducing communication with said container, the introduction of a predetermined amount of water into the container causing a downward pivoting of said one end of the balance arm, an adjustable counterweight on said arm for varying the amount of water needed to cause said downward pivoting, a control lever mounted on said support bracket for pivotal movement in a vertical plane from a first upwardly extending position to a second downwardly extending position, a cam on said lever engageable with said switch, said cam maintaining said switch in an on position when said lever is in the first position, said cam enabling a movement of the switch to an off position upon the lever assuming the second position, a keeper on said balance arm, said keeper being releasably engageable with said lever when said lever is in the upwardly extending first position and said balance arm is orientated substantially horizontal, said keeper releasing said lever for movement to the downwardly extending second position upon the downward pivoting of one end of the balance arm upon the introduction of a predetermined amount of water into the container.

4. The structure of claim 1 wherein said holder means consist of a solid body having a longitudinal passage extending therethrough, and a transverse aperture communicating with the approximate center of said passage, the end of the leader tube being retained in said aperture in a manner so as to direct the water flowing therefrom toward the side of the passage opposite said aperture, the water subsequently flowing smoothly out of the opposite end of the passage.

5. For use in a water distribution system for a plurality of plants, a water supply main, at least one distributing unit and an enlarged manifold, said unit including a supply tube, said supply tube having one end in water receiving communication with said supply main and the second end in communication with the enlarged manifold, a plurality of equal length elongated leader tubes extending outwardly from said manifold toward separate ones of the plurality of plants, a solenoid valve for regulating the flow of water through the supply main, and means for automatically closing the valve upon the flowing of a predetermined amount of water from the leader tubes, said means for automatically closing the valve consisting of an upright support bracket, a switch means mounted to one side of said bracket, a balance arm, means pivotally mounting said arm at an intermediate point thereof on the bracket, a water receiving container mounted on one end of said arm, one of said leader tubes being in water introducing communication with said container, the introduction of a predetermined amount of water into the container causing a downward pivoting of said one end of the balance arm, an adjustable counterweight on said arm for varying the amount of water needed to cause said downward pivoting, a control lever mounted on said support bracket for pivotal movement in a vertical plane from a first upwardly extending position to a second downwardly extending position, a cam on said lever engageable with said switch means, said cam maintaining said switch means in an on position when said lever is in the first position, said cam enabling a movement of the switch means to an off position upon the lever assuming the second position, a keeper on said balance arm, said keeper being releasably engageable with said lever when said lever is in the upwardly extending first position and said balance arm has orientated substantially horizontal, said keeper releasing said lever for movement to the downwardly extending second position upon the downward pivoting of the one end of the balance arm upon the introduction of a predetermined amount of water into the container.

6. The structure of claim 5 including a one-way check valve in said supply main positioned so as to allow a free flow of water to the distributing unit while preventing any backflow.

7. The structure of claim 5 including a second water supply main, a common source of water for both mains, a solenoid valve for regulating the flow of water through the second supply main, and means for controlling said last mentioned solenoid valve, said last mentioned means being connected in series with the means for automatically closing the first valve in a manner so as to provide a sequential flow of water through the mains.

8. In combination, an elongated flexible leader tube having an inlet end communicatable with a source of water and an outlet end positionable within the vicinity of a growing plant, and an enlarged weight means surrounding and being secured to the outlet end of the flexible leader tube so as to retain the outlet end in the vicinity of the plant against the tendency of the water flowing therethrough to displace this outlet end, said weight means consisting of an enlarged body, said body having a passage extending completely therethrough, and an aperture generally perpendicular to said passage, said aperture extending from communication with said passage, at an intermediate point therealong, outward through said body, the outlet end of said flexible leader tube being fixed within said aperture in a manner so as to direct the water flowing therethrough transversely into said passage and toward the far wall.

9. The structure of claim 8 wherein said body has an enlarged base portion, a reduced upper end portion, and upwardly converging sides, said passage extending through the upper end portion, the major weight of the weight means being concentrated in the enlarged base.

10. The structure of claim 8 wherein said leader tube has a flow passage approximately capillary in size.

11. The structure of claim 8 wherein said weight means includes a portion adding weight thereto beyond the inherent weight of the portions of the body necessary to define the passage and the aperture.

References Cited by the Examiner

UNITED STATES PATENTS

| 2,284,158 | 5/42 | Lewis | 239—65 |
| 2,335,716 | 11/43 | Weeden | 239—65 |
| 2,438,800 | 3/48 | Boylan | 137—121 |
| 2,577,337 | 12/51 | Lancaster | 239—65 |
| 2,751,924 | 6/56 | Hynd | 137—121 |
| 2,776,860 | 1/57 | Griffis | 239—65 |
| 2,969,186 | 1/61 | Geiger | 239—65 |
| 2,991,938 | 7/61 | Norcross | 239—65 |
| 3,085,364 | 4/63 | Chapin | 47—1 |

EVERETT W. KIRBY, *Primary Examiner.*

THEODORE G. CRAVER, *Examiner.*